(No Model.)

H. G. BROOKS.
LOW WATER ALARM.

No. 310,786. Patented Jan. 13, 1885.

WITNESSES
David Cunningham
Heman E. Newton

INVENTOR
Henry G. Brooks
per B. F. Welles
Atty.

UNITED STATES PATENT OFFICE.

HENRY G. BROOKS, OF BATTLE CREEK, MICHIGAN.

LOW-WATER ALARM.

SPECIFICATION forming part of Letters Patent No. 310,786, dated January 13, 1885.

Application filed July 24, 1884. (No model.)

*To all whom it may concern:*

Be it known that I, HENRY G. BROOKS, a citizen of the United States, residing at Battle Creek, in the county of Calhoun, State of Michigan, have invented a new and useful Low-Water Alarm for Steam-Boilers, of which the following is a specification.

My invention relates to improvements in low-water alarms, wherein a float operating a steam-whistle is contained in an upright cylinder, which is connected either directly or through an auxiliary drum with the ordinary gage or try cocks or with the boiler; and the objects of my invention are to do away with the irregular vibrations of the float due to the inevitable commotion of the water in the boiler when in use, and to produce a continuous circulation of pure water in the try-cocks and so prevent their stoppage by sediment and limy incrustation. I attain these objects by the mechanism illustrated in the accompanying drawings, in which—

Figure 1:
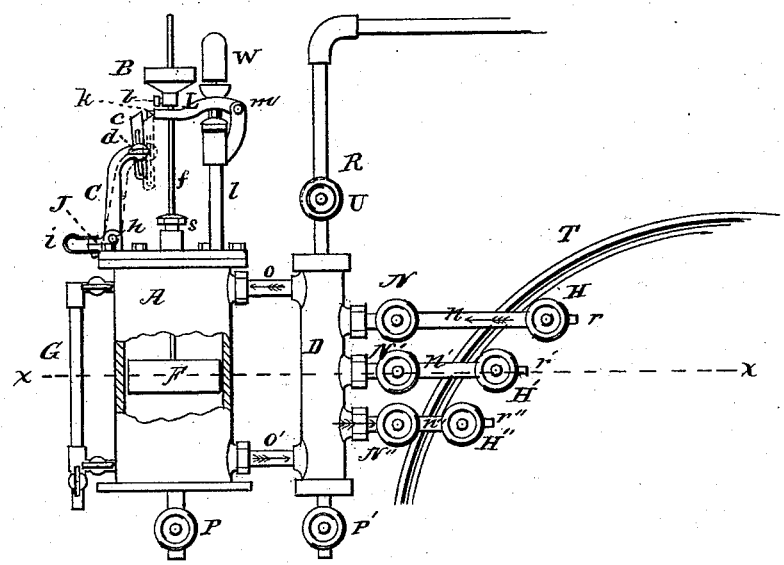
Figure 2:
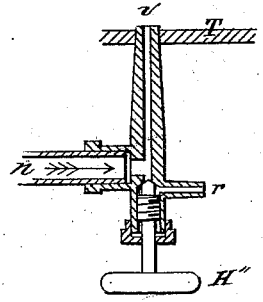

Figure 1 is a vertical elevation. Fig. 2 is a section of try-cock and pipe-connection.

Similar letters refer to similar parts in each figure.

Cylinder A contains a float, F, from which a stem, $f$, leads up through a stuffing-box, $s$, and carries a cup, B, adjustable at any point by the set-screw $b$. The whistle W is connected either with the cylinder A or directly with the boiler T. The whistle-lever L is slotted longitudinally for the passage of the stem $f$. At the end of the lever L is a ratchet-shaped notch, $k$. A dog-arm, C, is hinged at $h$, and has a slotted nose, $c$, adjustable by means of the thumb-screw $d$. The arm C is held upright by the U-shaped spring $i$ acting on the short arm J. The water-glass G is connected directly to the cylinder A. The auxiliary drum D is connected at top and bottom by pipes $o$ and $o'$ to the cylinder A, and by pipes $n$ $n'$ $n''$, which are provided with stop-cocks N N' N'', with try-cocks H H' H''. From the top of D a pipe, R, also provided with a stop-cock, U, runs to the steam-dome.

T is a portion of the boiler. P and P' are blow-off cocks, and $x$ $x$ is water-line.

The operation of the device is as follows: See that the cocks N N' N'' are open, when the water will stand in the cylinder A at the same level as in the boiler. Load the float F by putting shot in the cup B until the float will barely overcome the friction of the stuffing-box. Then set the cup B by the set-screw $b$, so that when the water settles to the "danger" line the boss of the cup will bear on the lever L and operate the whistle. Set the dog $c$ by the thumb-screw $d$, so that when the dog-arm C is pressed over, the dog $c$ will engage notch $k$ and support the lever L clear of the stem of the whistle-valve. When everything is in order and in position, as shown, suppose the water to have fallen to the "danger" line, the boss under cup B rests upon the lever L and the weight of the float and its load B opens the whistle-valve, giving the alarm. The attendant turns on the pumps, then raises the lever L and with it the float F and places the dog $c$ under it. The dog is held in place by the weight resting upon it until the rising water lifts the float and with it the load B, when the action of the spring $i$ throws the dog $c$ back out of the way and all is ready to give the alarm again on the fall of water-level. The pipe R is not a necessary part of the apparatus, but it is desirable to furnish dry steam to the apparatus, especially when the water rises to the upper try-cock, H. The cylinder A being somewhat exposed the steam occupying the upper part of it is slowly condensed, thus tending to raise the water-line, and hence keeps a continuous flow outward through $o'$, drum D, and the pipes $n$ $n'$ $n''$ and gage-cocks H H' H'', which may be below the water-line. As this water is distilled and therefore perfectly pure, no deposits or incrustation can take place in any part of the apparatus. The pipes $n$ $n'$ $n''$ might be connected directly to cylinder A without the intervention of the drum D, the object of which is to lessen the influence of irregular commotion of the water in the boiler T, causing irregular vibrations of the float F. The whistle also may be connected directly with the boiler or any other part of the apparatus that would supply it with steam. For the purpose of a low-water alarm alone the pipes $n$ $n'$ $n''$ might be connected directly to the boiler without the intervention of the gage-cocks H H' H''; or for the purpose of obtaining a circulation through the gage-cocks alone the float and other connections with the alarm-whistle might be omitted.

I am aware that prior to my invention floats have been used in the construction of low-water alarms. I therefore do not broadly claim the use of a float in the construction of a low-water alarm; but What I do claim, and desire to secure by Letters Patent, is—

1. The float F, having rigidly connected therewith the stem $f$, said stem being provided at its upper portion with an adjustable cup, in combination with the whistle-lever L, slotted to engage the stem $f$, and the cylinder A, having communication with the boiler, all arranged and operating substantially in the manner described, and for the purpose specified.

2. The adjustable dog C $c$, in combination with the lever L of an alarm-whistle, substantially as herein described and shown.

3. In a low-water alarm, the auxiliary drum D, in combination with the cylinder A and pipes $n$ $n'$ $n''$, substantially as and for the purpose shown and described.

4. The low-water apparatus herein described, consisting of the float F, containing cylinder A, auxiliary drum D, dog C, and connecting-pipes $o$ $o'$ $n$ $n'$ $n''$, in combination with the gage-cocks H, H', and H'', and with an alarm-whistle, substantially as and for the purpose as shown and specified.

HENRY G. BROOKS.

Witnesses:
 B. F. WELLES,
 GEO. S. WRIGHT.